No. 724,224. PATENTED MAR. 31, 1903.
J. WIECHMANN.
ROTARY ENGINE.
APPLICATION FILED DEC. 17, 1902.
NO MODEL. 2 SHEETS—SHEET 2.

WITNESSES: Edward Thorpe.

INVENTOR
John Wiechmann
BY Munn
ATTORNEYS.

UNITED STATES PATENT OFFICE.

JOHN WIECHMANN, OF ALBANY, NEW YORK.

ROTARY ENGINE.

SPECIFICATION forming part of Letters Patent No. 724,224, dated March 31, 1903.

Application filed December 17, 1902. Serial No. 135,483. (No model.)

*To all whom it may concern:*

Be it known that I, JOHN WIECHMANN, a citizen of the United States, and a resident of Albany, in the county of Albany and State of New York, have invented a new and Improved Rotary Engine and Pump, of which the following is a full, clear, and exact description.

The object of the invention is to provide a new and improved rotary engine and pump which is simple and durable in construction, very effective and economical in operation, and arranged to utilize the motive agent expansively to the fullest advantage.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1:
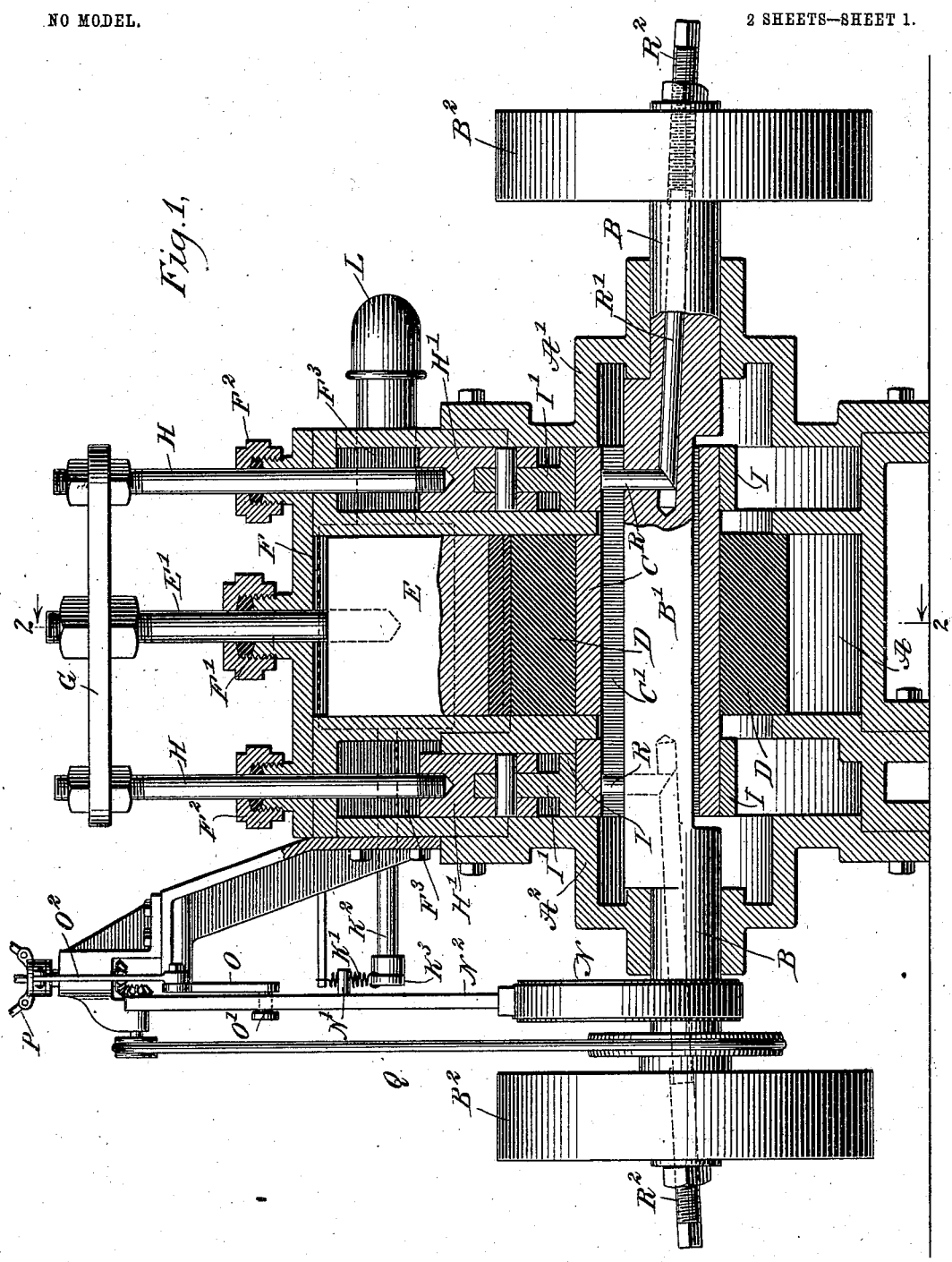
Figure 2:
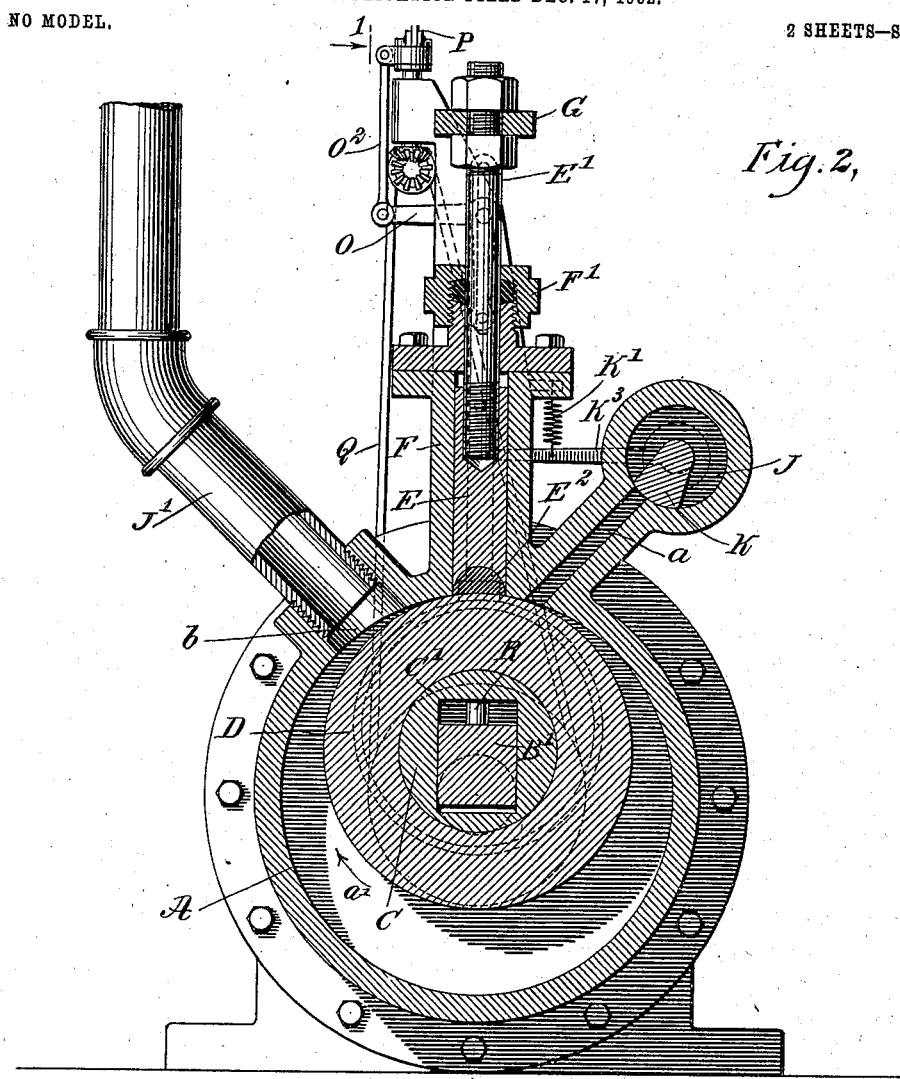
Figure 3:
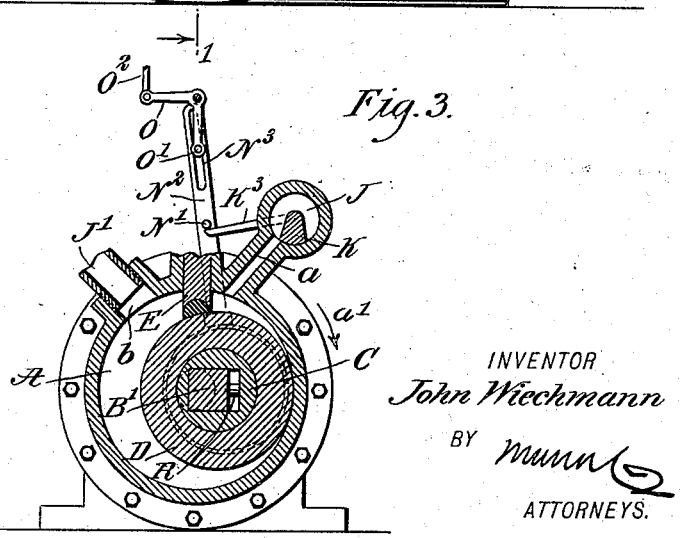

Figure 1 is a longitudinal sectional elevation of the improvement on the line 1 1 of Fig. 2. Fig. 2 is a transverse section of the same on the line 2 2 of Fig. 1; and Fig. 3 is a reduced transverse section of the same, showing the parts in a different position.

The cylinder A of the rotary engine is provided with heads A' and A², in which is centrally journaled a main shaft B, formed between the said heads with a crank B', polygonal in cross-section and engaging a correspondingly-shaped elongated opening C' in a sleeve C, on which is mounted to turn loosely a cylindrical piston D in rolling contact with the inner face of the cylinder A. The peripheral surface of the piston D is engaged by the inner end of an abutment E, mounted to slide in bearings F, extending radially from the cylinder A, preferably at the top thereof, and the said abutment E is provided with a stem E', extending through a stuffing-box F', to connect at its outer end with a cross-head G, carrying rods or stems H, passing through stuffing-boxes F² into bearings F³, likewise arranged on the cylinder on opposite sides of the bearings F. The rods H are secured at their inner ends to slides H', mounted to move in the bearings F³ and pivotally connected with the rods I' of rings I, mounted to turn on the ends of the sleeve C to form with the latter eccentrics on the shaft B, so that when the engine is in operation the slides H' receive an up-and-down sliding motion in their bearings F³, and this up-and-down movement of the slides is transmitted by the rods H, cross-head G, and stem E' to the abutment E to move the latter up and down in unison with the rolling over of the piston D within the cylinder A.

Into the cylinder A opens an inlet-port a adjacent to the entrance of the abutment into the cylinder A, and the said port a leads from a valve-chamber J, containing a cut-off valve K and connected at one end by a pipe L with a boiler or other motive-agent supply.

An exhaust-port b leads from the cylinder A on the opposite site of the abutment - entrance, and this port is connected with an exhaust-pipe J' for carrying off the exhaust motive agent. Now when the valve K is opened then the motive agent passes by way of the port a into the cylinder, between the abutment E and the contact-point of the piston D with the cylinder A, so that the piston D is pressed on by the steam to turn the shaft B in the direction of the arrow a', the piston rolling over on the inside of the cylinder A. The valve K is normally held in a closed position by a spring K', and on the outer end of the stem K² of the said valve K is secured an arm K³, normally extending into the path of a pin N', held on the rod N² of an eccentric N, mounted on the shaft B, as plainly indicated in the drawings. Now as soon as the contact-point between the piston D and the cylinder A has passed the port a then the eccentric N by the rod N² and pin N' imparts a swinging motion to the arm K³ to move the valve K to an open position, so that the motive agent can pass through the port a into the cylinder A to turn the piston D in the direction of the arrow a'. Now it is understood that as the piston D is mounted on the crank B' of the main shaft B a turning motion is given to the said main shaft, whereby the piston is carried eccentrically around in the cylinder A, with the peripheral surface of the cylinder rolling over on the inner surface of the cylinder A. When the piston D and shaft B have made about one-third of a revolution, then the eccentric N is on the return stroke, so that the pin N' moves upward to allow the spring K' to close the valve K to cut off the motive agent from the cylinder, thus allowing the steam in the cylinder to act expansively on the piston to continue the rotary motion thereof. When the piston D finally passes the port $b$, then the steam is free to escape from the cylinder by way of the said exhaust-port $b$ into the exhaust-pipe J'. In case the engine runs beyond a normal rate of speed then the pin N' moves out of the path of the arm $K^3$, so that the valve K remains closed by the action of the spring K' until the normal rate of speed is again reached. Now in order to govern the rod $N^2$ for the purpose mentioned I provide the said rod with an elongated slot $N^3$, into which projects a pin O', held on one end of a bell-crank lever O, pivotally connected at its other arm by a link $O^2$ with a governor P, so that on an increase of speed the governor pulls the link $O^2$ upward to impart a swinging motion to the bell-crank lever O, whereby the rod $N^2$ is swung to one side to swing the pin N' out of the path of the arm $K^3$. Thus the following downward movement of the eccentric N does not affect the valve K, as the pin N' passes the free end of the arm $K^3$ without imparting a swinging motion thereto. The governor P is driven from the shaft B by a suitable pulley-and-belt connection Q, as indicated in Figs. 1 and 2.

In order to take up the rear of the piston D within the cylinder A, the sleeve C is engaged by pins R, mounted to slide radially in the crank-arm B' of the main shaft B, and the inner ends of the said arms A are beveled to engage corresponding bevels on rods R', mounted to slide lengthwise in the shaft B, as shown in Fig. 1. The ends of the rods R' are engaged by screw-rods $R^2$, screwing in the ends of the shaft B, so as to force the rods R' inward to cause their bevels to act on the bevels of the rods R to push the same outward in the crank-arm B', so as to bring the peripheral face of the piston D in firm contact with the inner surface of the cylinder A.

The main shaft B is provided with suitable pulleys $B^2$, connected by belts with other machinery to be driven.

The inner end of the abutment E is provided with a packing-ring $E^2$, mounted to rock in the abutment, to make at all times a firm contact with the peripheral face of the piston D, to prevent leakage of steam from the inlet side of the cylinder to the exhaust side thereof, as will be readily understood by reference to Figs. 2 and 3.

Having thus described my invention, I claim as new and desire to secure by Letters Patent—

1. A rotary engine comprising a cylinder, a crank-shaft mounted to turn in the cylinder, a sleeve held on the crank-arm of said shaft, a cylindrical piston mounted to turn on said sleeve and in rolling contact with the inner surface of the cylinder, a sliding abutment in the cylinder engaging the peripheral face of said piston, and slides, connected with the said sleeve and with the said abutment, as set forth.

2. A rotary engine, comprising a cylinder, a crank-shaft mounted to turn in the cylinder, a sleeve held on the crank-arm of the shaft, a cylindrical piston mounted to turn on said sleeve, an abutment mounted to slide in bearings extending radially from the cylinder and engaging the peripheral face of said piston, and slides mounted to move in bearings arranged on the cylinder at opposite sides of the bearings for the abutment, and connected with the said abutment and with the said sleeve, as set forth.

3. A rotary engine, comprising a cylinder, a crank-shaft mounted to turn in the cylinder, a sleeve held on the crank-arm of said shaft, a cylindrical piston mounted to turn on said sleeve and in rolling contact with the inner surface of the cylinder, a sliding abutment in the cylinder engaging the peripheral face of said piston, the said abutment being provided with a stem connected at its outer end with a cross-head, slides mounted to move in bearings at opposite sides of the bearings for the abutment and provided with rods connected with said cross-head, and rings mounted to turn on the ends of the sleeve and forming with the latter eccentrics on the main shaft, the said rings being connected by rods with the said slides, as set forth.

4. A rotary engine comprising a cylinder having a valve-controlled inlet, an exhaust, an abutment slidable in and out of the cylinder between the said inlet and the said exhaust, a crank-shaft mounted to turn in the said cylinder, a sleeve adjustable transversely on the crank-arm of the said crank-shaft, a cylindrical piston mounted to turn on the said sleeve and in rolling contact with the inner surface of the said cylinder and engaged by the said abutment, and slides driven from the crank-shaft and connected with the said abutment to actuate the latter in unison with the movement of the piston in the cylinder, as set forth.

5. A rotary engine comprising a cylinder, a crank-shaft mounted to turn in the said cylinder, a cylindrical piston mounted on the crank-arm of the shaft and in rolling contact with the inner surface of the cylinder, a sliding abutment in the cylinder, engaging the peripheral face of the said piston, and slides operatively connected with the crank-shaft and connected with the said abutment, to actuate the latter in unison with the movement of the piston in the cylinder, as set forth.

6. A rotary engine comprising a cylinder, a crank-shaft mounted to turn in the said cylinder, a cylindrical piston mounted on the crank-arm of the shaft and in rolling contact with the inner surface of the cylinder, a sliding abutment in the cylinder, engaging the peripheral face of the said piston, and a valve controlling an inlet for the said cylinder and opened from the said shaft, as set forth.

7. A rotary engine comprising a cylinder, a crank-shaft mounted to turn in the said cylinder, a cylindrical piston mounted on the crank-arm of the shaft and in rolling contact with the inner surface of the cylinder, a sliding abutment in the cylinder, engaging the peripheral face of the said piston, a valve-controlled inlet for the said cylinder, means for opening the valve from the said shaft, and a spring for closing the valve, as set forth.

8. A rotary engine comprising a cylinder, a crank-shaft mounted to turn in the said cylinder, a cylindrical piston mounted on the crank-arm of the shaft and in rolling contact with the inner surface of the cylinder, a sliding abutment in the cylinder, engaging the peripheral face of the said piston, a valve for controlling the inlet to the said cylinder, a spring for normally closing the valve, an eccentric device on the crank-shaft, connected with the valve, for opening the same, and a governor connected with the eccentric device, for moving the latter out of engagement with the valve when the engine runs beyond a normal rate of speed, as set forth.

9. A rotary engine comprising a cylinder having a valved inlet, an exhaust, an abutment sliding in and out of the cylinder, a crank-shaft mounted to turn in the said cylinder and connected with the said abutment, to actuate the latter, a sleeve held on the crank-arm of the said shaft, a cylindrical piston mounted to turn on the said sleeve, and means for adjusting the said sleeve, to hold the piston in rolling contact with the inner surface of the cylinder, as set forth.

10. A rotary engine provided with a cylinder, a crank-shaft mounted to turn therein, a sleeve slidable transversely on the crank-arm of the said crank-shaft, means for adjusting the said sleeve transversely on the said crank-arm, and a cylindrical piston mounted to rotate loosely on the said sleeve and in frictional contact with the inner surface of the said cylinder, as set forth.

11. A rotary engine, comprising a cylinder, a crank-shaft mounted to turn therein, a sleeve slidable transversely on the crank-arm of the said shaft, a cylindrical piston mounted to rotate on the said sleeve, pins mounted to slide in the crank-arm of the shaft and engaging the said sleeve, and means for moving the said pins to adjust the sleeve and piston, as set forth.

12. A rotary engine, comprising a cylinder, a crank-shaft mounted to turn therein, a sleeve adjustable transversely on the crank-arm of the shaft, a cylindrical piston mounted to turn loosely on the sleeve, and means for adjusting the sleeve to hold the piston in rolling contact with the inner surface of said cylinder, the said means comprising pins mounted to slide radially in the crank-arm of the main shaft and engaging the said sleeve, the said pins having beveled ends, rods mounted to slide lengthwise in the main shaft and having corresponding bevels for engaging the bevels of the pins, and means for forcing the said rods inward, as set forth.

13. A rotary engine, comprising a cylinder having an inlet and an exhaust, a crank-shaft mounted to turn in the said cylinder, the crank being polygonal in cross-section, a sleeve having a correspondingly-shaped elongated opening engaged by the said crank, a cylindrical piston mounted to turn on the said sleeve, an abutment slidable in and out of the cylinder between the said inlet and exhaust, and engaging the peripheral face of the said piston, a valve controlling the inlet for the cylinder, means for opening the said valve from the shaft, and means for adjusting the sleeve on the shaft to hold the piston in rolling contact with the inner surface of the cylinder, as set forth.

14. A rotary engine, comprising a cylinder having an inlet and an exhaust, a crank-shaft mounted to turn in the said cylinder, a cylindrical piston mounted on the crank-arm of the shaft, a sliding abutment between the inlet and the exhaust and engaging the peripheral face of said piston, a normally closed valve for controlling the inlet to said cylinder, a governor driven from the crank-shaft, and means actuated from the crank-shaft for opening said valve, the said means being controlled from the governor, as set forth.

In testimony whereof I have signed my name to this specification in the presence of two subscribing witnesses.

JOHN WIECHMANN.

Witnesses:
  FRANK MÜLLER,
  ALBERT MEIER.